United States Patent [19]

Spirig

[11] 4,206,029

[45] Jun. 3, 1980

[54] DETONATING GAS GENERATOR

[76] Inventor: Ernst Spirig, P.O. Box 160, Speerstrasse 14, CH-8640 Rapperswil, Switzerland

[21] Appl. No.: 36,290

[22] Filed: May 7, 1979

[30] Foreign Application Priority Data

May 15, 1978 [GB] United Kingdom ............... 19602/78

[51] Int. Cl.$^2$ ...................... C25B 15/02; C25B 15/08; C25B 9/00; C25B 11/03
[52] U.S. Cl. .................................. 204/228; 204/268; 204/270; 204/274; 204/284; 204/290 R; 204/292
[58] Field of Search ............... 204/228, 129, 268–270, 204/274, 278, 284, 290 R, 292

[56] References Cited

U.S. PATENT DOCUMENTS

| | | | |
|---|---|---|---|
| 3,518,180 | 6/1970 | Grotheer | 204/268 |
| 3,990,962 | 11/1976 | Götz | 204/278 X |
| 3,994,798 | 11/1976 | Westerlund | 204/268 |
| 4,014,777 | 3/1977 | Brown | 204/270 |
| 4,124,480 | 11/1978 | Stevenson | 204/268 |

FOREIGN PATENT DOCUMENTS 2159246 6/1973 Fed. Rep. of Germany ........... 204/270

Primary Examiner—John H. Mack
Assistant Examiner—D. R. Valentine
Attorney, Agent, or Firm—Lawrence E. Laubscher

[57] ABSTRACT

A generator for oxyhydrogen gas comprises a plurality of flat metal electrodes mounted parallel with ring-like spacers between each pair of adjacent electrodes and bolts clamping the spacers and electrodes together to provide a sealed cell between each pair of electrodes within the periphery of the respective spacer. An inlet for electrolyte is connected to one outer cell and an outlet for the gas is connected to the outer cell. The electrodes are imperforate except for apertures adjacent the tops of the cells and in use a DC power source is connected across outer electrodes. The generator is of simple construction and achieves good cooling, high mechanical strength against internal explosions and ensures a minimal quantity of explosive gas in the upper regions of the cells.

23 Claims, 4 Drawing Figures

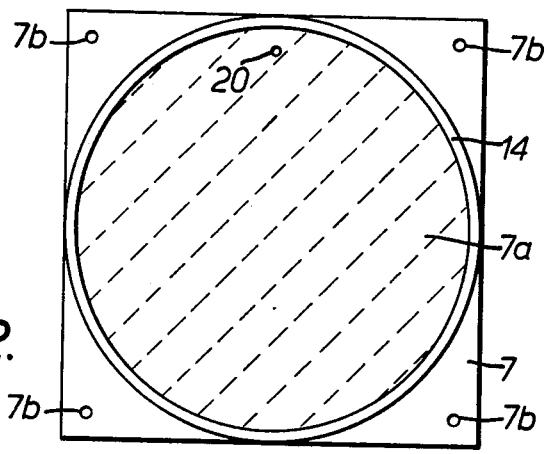
FIG.2.
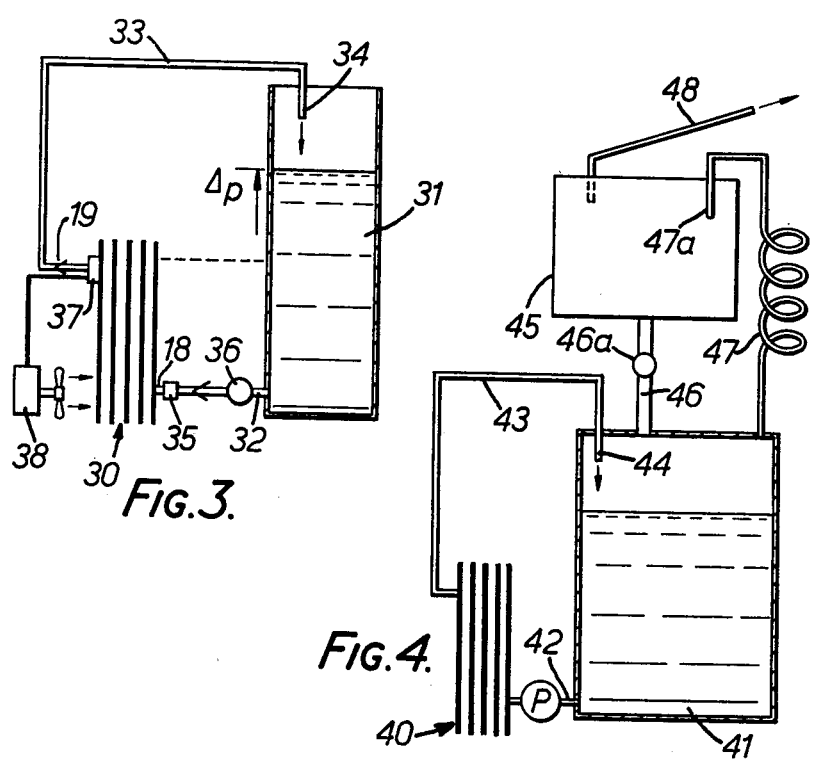
FIG.3.
FIG.4.

DETONATING GAS GENERATOR

This invention is an improvement on the apparatus described and claimed in my British Pat. No. 1,519,679 (U.S. Pat. No. 4,113,601) and aims at a simplified construction which nevertheless achieves improved cooling, high mechanical strength against any internal explosions and minimal volume of explosive gas mixture in the upper regions of the cells.

In accordance with the invention, there is provided a detonating gas generator, comprising a plurality of flat metal electrodes mounted parallel to each other with a ring-like spacer disposed between each pair of adjacent electrodes, means for clamping the plurality of electrodes and spacers together so as to provide a sealed cell between each pair of adjacent electrodes and within the periphery of the respective spacer, an inlet connected or connectable to a source of electrolyte and formed through one outer electrode and into the respective cell, an outlet for detonating gas formed through the other outer electrode adjacent the top of the respective cell, and apertures formed in the intervening electrodes adjacent the tops of the respective cells, the intervening electrodes being otherwise imperforate at least within the cells, and the outer electrodes being connected or connectable to respective poles of a DC electrical supply.

Embodiment of this invention will now be described, by way of examples only, with reference to the accompanying drawings, in which:

FIG. 2 is a vertical section through a modified generator, the section being parallel to the plate electrodes;

FIG. 3 is a diagram of a gas generator used with an electrolyte reservoir; and

FIG. 4 is a diagram of a gas generator used with an electrolyte reservoir and a trapping means for condensing water vapour entrained with the gas which is produced by the generator.

Figure 1:
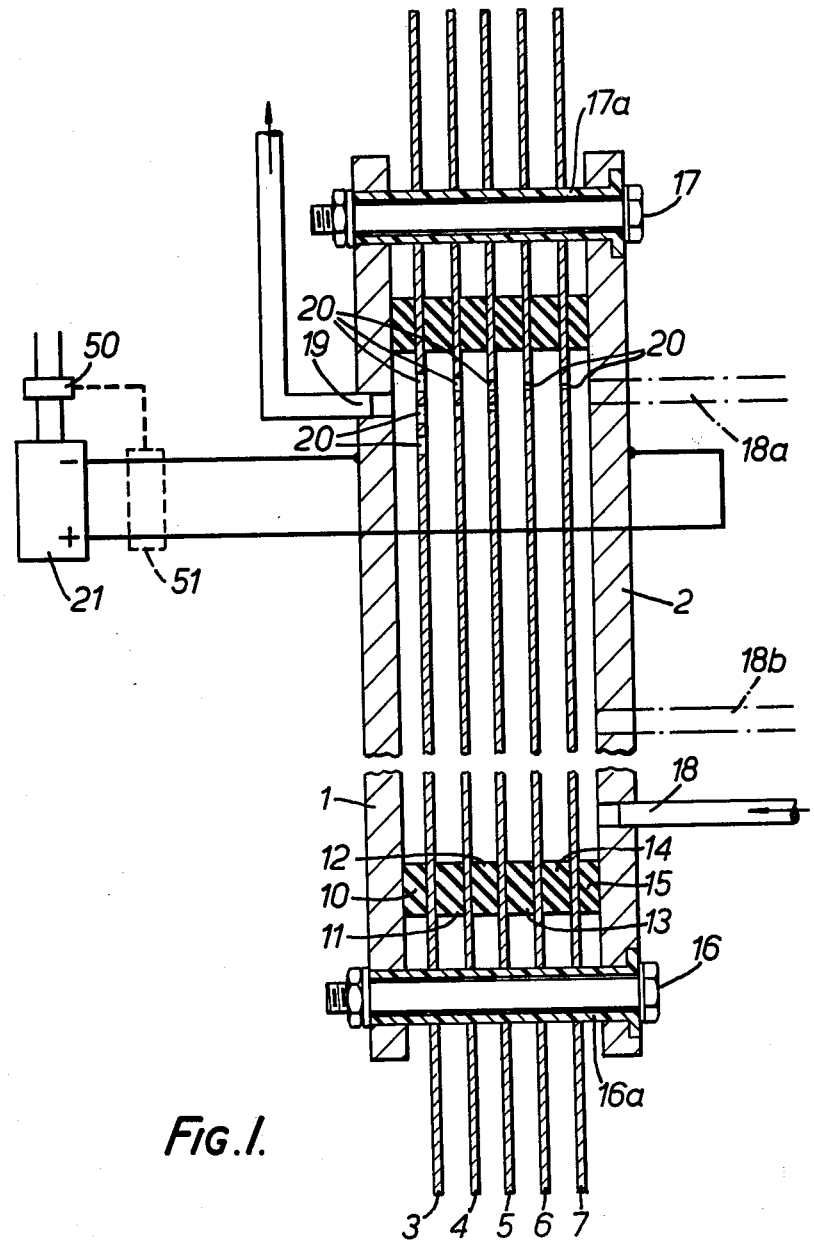
FIG. 1 is a vertical section through one embodiment of detonating gas generator, the section being in a plane perpendicular to the plate electrodes.

The generator shown in FIG. 1 comprises a plurality of electrodes, comprising two outer electrodes 1,2 and a plurality of intervening electrodes 3,4,5,6,7 an electrolysis cell being formed between each adjacent pair of electrodes. Each of the electrodes is flat and rectangular and is stamped from a flat sheet of metal. Each electrode is mounted parallel to the other and it will be noted that the outer electrodes 1,2 are formed from substantially thicker sheet metal than the intervening electrodes. In the example shown, the intervening electrodes are larger in both height and width and project beyond the edges of the outer electrodes in both vertical directions and both horizontal directions.

Adjacent pairs of electrodes are spaced apart by generally ring-shaped spacers 10,11,12,13,14,15 of resilient material. These spacers may be circular rings or rectangular-shaped frames and are stamped from sheet material. This material may comprise rubber but must be resistant to the alkaline solutions forming the electrolyte. It will be noted that the spacers are aligned with each other, that the intervening spaces are aligned with each other and that the outer electrodes 1,2 are aligned with each other.

The electrodes and spacers are clamped together by appropriate means. In the example shown, these means comprise a plurality of bolts clamping the outer electrodes together. The bolts are spaced apart around the periphery of the cells (outwardly of the spacers) and each bolt extends through bores formed through the electrodes. Two of the bolts 16,17 are shown and electrical insulation 16a, 17a is provided to insulate the metal bolts from the individual electrodes.

The clamping means serves to clamp the electrodes and spacers together and in particular to compress the spacers, thus ensuring an effective peripheral seal between each spacer and the two electrodes between which it is clamped. The surfaces of the electrodes may be sandblasted to increase the effective surface area for the electrolysis process and to improve the strength of the spacers against any excessive pressures which may develop within the individual cells.

An inlet aperture 18 for electrolyte is formed through the outer electrode 2, adjacent the bottom of the cell which is formed between electrodes 7 and 2. Alternatively, this inlet aperture may be provided adjacent the top of its cell, or at an intermediate position, as indicated in dotted lines at 18a, 18b respectively. An outlet aperture 19 for oxyhydrogen gas is formed through the outer electrode 1, adjacent the top of the cell formed between electrodes 1 and 3. A series of apertures 20 is provided in the intervening electrodes, adjacent the top of the respective cells for the transfer of the generated oxyhydrogen foam from the successive cells and towards the outlet 19, in the manner described in my British Pat. No. 1,519,679. The electrodes 1-7 are otherwise imperforate. In use, the outer electrodes 1,2 are connected to the negative and positive poles, respectively, of a DC electrical supply 21. Initially, electrolyte (basically water) fills the cells to the level of the apertures 20 but, in use, the gas which is produced fills the upper regions of the cells and depressed the level of electrolyte. Gas leaves the cells through the outlet 19 and fresh electrolyte enters continuously through inlet 18,18a or 18b.

All electrodes are simple and inexpensive to produce and can be produced by cutting or stamping from metal sheet. The seals provided by the spacers are simple and effective and the spacers are simple to form from suitable sheet material. Also, effective cooling is achieved as a result of the electrodes extending substantially beyond the spacers and into the surrounding air. The distance between electrodes is easily selected by selecting spacers of the appropriate thickness.

The generator has high mechanical strength against any internal explosions which may occur by accident. Thus, the clamping bolts 16,17 provide strength against force acting perpendicular to the planes of the electrodes, whilst forces acting parallel to the planes of the electrodes are withstood by the spacers being compressed between the electrodes. There is no need for a pressure vessel in which to place the apparatus. It is possible to work with higher pressures than hitherto and this reduces the losses in the electrolyte because the electrical resistance of the electrolyte, for the same amount of gas bubbles, is lower at increased pressure because the individual bubbles are smaller and therefore have less influence on the current path between adjacent electrodes.

The design is appropriate for very small electrolysis cells, which have the advantage of reducing current heating because of the smaller physical distance between cells. Therefore, a practical apparatus may comprise a large number of cells and make use of a rectified 220 volts A.C. supply.

The structure shown in the drawing may be placed in a vessel which is filled with electrolyte, according to the teachings of FIG. 1 of my British Pat. No. 1,519,679 providing all exposed metal electrode surfaces are electrically insulated against the electrolyte which fills the vessel. Alternatively, the structure may be provided with cooling tubing between the outlet and inlet, in the manner taught by FIG. 3 of my British Pat. No. 1,519,679.

The apertures or holes 20 may progressively increase in size from electrode-to-electrode, being smallest in electrode 7 and largest in electrode 3, to accommodate the increase in gas flow which occurs between the input cell and the output cell. The same effect may be produced by a progressive increase in the number of holes in the successive cells, or both by an increase in number and size. All these variations are indicated diagrammatically, and enlarged in scale, in FIG. 1.

The electrodes in FIG. 1 are formed from iron, stainless steel or nickel, for example. Alternatively, the electrodes may be formed from copper sheet plated with a suitable metal or alloy. The copper exhibits high heat conductivity and high current conductivity (so that there is less loss by current flow through the electrodes). The plating metal or alloy is chosen to result in a low electrolysis voltage, for example nickel. The plating need not cover the entire surface of the electrode, but only over the area within the peripheral spacers 15 (that is to say, only the area of the electrode which is in contact with the electrolyte). As a result, the electrolysis voltage (overvoltage) is minimised and high cooling efficiency is achieved and the electrodes are of minimal cost because the quantity of metal for the active electrode surface is minimised.

FIG. 2 shows, on reduced scale, a preferred arrangement comprising square electrodes, all of equal size, and circular spacer rings, the diameter of the spacer rings being equal to the side length of each electrode. Only electrode 7 and spacer 14 are seen. Assembly with this arrangement comprises simply stacking the electrodes and seals together, alignment being automatically ensured (because the ring diameter is the same as the side length of the electrodes) without special tooling being required. The projecting corners of the square electrodes still act as cooling fins. In this example, the electrodes are formed from copper sheet plated with metal or alloy over the area within the spacer rings, as previously mentioned and as indicated by shading at 7a. Bolt holes for bolts such as 16,17 are shown at 7b.

FIG. 3 shows diagrammatically use of any of the above described forms of generator (shown at 30) with a reservoir 31 of electrolyte. An outlet adjacent the bottom of the reservoir is connected to the generator inlet 18 by a tube 32, and the generator outlet 19 is connected by a tube 33 to a spout 34 in the reservoir above the free surface of electrolyte. From this spout, excess electrolyte returns to the reservoir volume and the oxyhydrogen gas passes upwards for use, for example in a flame torch. Generally, the heat $\Delta p$ (of the free surface of electrolyte in the reservoir above the top of the cells) is small, and advantageously a one-way valve (such as a ball valve) is connected in the inlet 18 to help establish the required flow direction of the electrolyte. Alternatively or in addition, a flow pump 36 is provided to help establish and maintain the required flow direction, and may be used for forcing a high rate of circulation if cooling is required.

Depending on the composition of the electrolyte and its concentration, its conductivity increases with temperature to a maximum and then decreases. Thus, a temperature sensor 37, such as a bimetallic element, is provided in the outlet 19 to control a cooling fan 38 which is shown diagrammatically and which is directed at the generator 30. The control is such that the cooling fan is inhibited until an optimal temperature of the electrolyte is sensed by temperature sensor 37, and then the fan is energised to maintain this optimal temperature.

The diameter of the outlet 19 and tube 33 are small, generally comparable to the size of the apertures 20, ensure a high pressure drop when the mixture of gas and electrolyte is discharged into the reservoir, therefore providing good separation of the gas and electrolyte.

FIG. 4 shows diagrammatically use of any of the above described forms of generator (shown at 40) with a reservoir 41 of electrolyte and trapping means 45 for preventing water vapour and traces of electrolyte being entrained with the oxyhydrogen gas which is produced. In the absence of the trapping means, with high gas production rates, this water vapour and traces of electrolyte will be present in the gas which is produced, adversely affecting the ability of the gas to burn properly in the flame torches for which it is used.

The electrolyte inlet of the generator 40 is connected to the reservoir 41 by a tube 42 and a pump P is provided. The outlet of the generator is connected to the reservoir by a tube 43, terminating in a spout 44. The trapping means comprises a closed vessel and a tube 46 extends from the closed top of reservoir 41 to the bottom of the trap vessel. Tube 46 includes a pressure responsive ball valve 46a spring biassed to a normally open condition. A further tube 47 extends from the top of reservoir 41 and enters the top of the trap vessel, its outlet orifice 47a at least being of small diameter relative to tube 46. Tube 47 includes a spiral portion as shown for cooling purposes. An outlet tube 48 for oxyhydrogen gas extends through the top of the trap vessel.

For low rates of gas production by the generator 40, the gas passes through tube 46, and its valve 46a, and also through tube 47 to the trap vessel 45. If the gas production rate increases, the pressure within the reservoir will build up and eventually the valve 46a will be closed under the effect of this increased pressure. Gas then passes to the trap vessel only through tube 47, and the gas issuing from orifice 47a experiences a substantial decrease in pressure, causing condensation of the water vapour contained therein. In this connection, it is to be noted that gas at high pressure can carry more water vapour, and that a sudden decrease in pressure causes the vapour to condense. The condensed water collects in the trap vessel.

When the gas pressure in the reservoir 41 reduces, for example in response to switching off the generator, the valve 46a will re-open and the condensed water will return to the reservoir through the tube 46. The unnecessary loss of water during gas production is therefore reduced. Without this trapping means, then depending on the operating temperatures and the production rates, water loss can be substantial, requiring more frequent refills or a larger reservoir. The gas issuing through tube 48, being free of water vapour, leads to an improved flame characteristic and prolongs the life of a flash back filter used in the flame torch.

Depending on the composition of the electrolyte and the metal surfaces of the electrodes, there may be a tendency for deposits to build up on one polarity side of each electrode. Accordingly, it is proposed to change the polarity of the connections to the DC source 21 from time-to-time, for example changing the connections each time the generator is switched off. The deposit built up in one operating period is then eroded in the next operating period, the deposit being flushed out of the generator cells by the flow of electrolyte. With small spacings between the electrodes this procedure is especially helpful to avoid requirements for generator servicing and cleaning. The change in polarity changes the electrodes in each cell at which the oxygen and hydrogen are generated. The direction of flow remains the same, being determined by the hydrostatic pressure produced by reservoir 31 or 41 and present at the inlet 18. Referring to FIG. 1, an on/off switch 50 in the lines L from an A.C. supply to the D.C. generator 21 may be mechanically or otherwise linked to a changeover switch 51, so that each time the A.C. supply is switched on by switch 50, the switch 51 is changed over to reverse the polarity connections to the gas generator.

I claim:

1. A detonating gas generator, comprising a plurality of flat metal electrodes mounted parallel to each other with a ring-like spacer disposed between each pair of adjacent electrodes, means for clamping the plurality of electrodes and spacers together so as to provide a sealed cell between each pair of adjacent electrodes and within the periphery of the respective spacer, and inlet connected or connectable to a source of electrolyte and formed through one outer electrode and into the respective cell, an outlet for detonating gas formed through the other outer electrode adjacent the top of the respective cell, and apertures formed in the intervening electrodes adjacent the tops of the respective cells, the intervening electrodes being otherwise imperforate at least within the cells, and the outer electrodes being connected or connectable to respective poles of a DC electrical supply.

2. A detonating gas generator as claimed in claim 1, in which the spacers comprise resilient material.

3. A detonating gas generator as claimed in claim 1 or 2, in which the spacers are circular rings of equal diameters.

4. A detonating gas generator as claimed in claim 3, in which the electrodes comprise square plates of equal side lengths which, side lengths are equal to the circular ring diameters.

5. A detonating gas generator as claimed in any preceding claim, in which said clamping means comprises a plurality of bolts spaced around the periphery of the cells, each bolt extending through all electrodes outwardly of the spacers.

6. A detonating gas generator as claimed in claim 5, in which the bolts comprise metal and further comprising insulation means for insulating the metal bolts from the individual electrodes.

7. A detonating gas generator as claimed in any preceding claim, in which the inlet is provided adjacent the bottom of its respective cell.

8. A detonating gas generator as claimed in any one of claims 1 to 6, in which the inlet is provided adjacent the top of its respective cell.

9. A detonating gas generator as claimed in any of claims 1 to 6, in which the inlet is provided intermediate the top and bottom of its respective cell.

10. A detonating gas generator as claimed in any one of the preceding claims, in which the electrodes are formed from sheet metal.

11. A detonating gas generator as claimed in claim 10, in which the electrodes comprise any one of iron, stainless steel and nickel.

12. A detonating gas generator as claimed in claim 10, in which the electrodes comprise copper plated at least over its area within the adjacent spacers.

13. A detonating gas generator as claimed in any preceding claim, in which said apertures progressively increase in size from the electrode nearest the inlet to the electrode nearest the outlet.

14. A detonating gas generator as claimed in any preceding claim, in which said apertures progressively increase in number from the electrode nearest the inlet to the electrode nearest the outlet.

15. Apparatus comprising a detonating gas generator as claimed in any preceding claim, in combination with a reservoir for containing electrolyte, said inlet communicating with the reservoir adjacent its bottom and said outlet communicating with the reservoir adjacent its top.

16. Apparatus as claimed in claim 15, comprising a one way valve disposed in said inlet or in a tube thereto from said reservoir.

17. Apparatus as claimed in claim 15 comprising a pump disposed in a tube from said reservoir to said inlet.

18. Apparatus as claimed in any one of claims 15 to 17, comprising a temperature sensor arranged to energise a cooling fan for said generator when the generator is above a predetermined operating temperature.

19. Apparatus as claimed in any one of claims 15 to 18, further comprising trapping means for condensing water vapour from the gas produced by the generator.

20. Apparatus as claimed in claim 19, comprising a trap vessel and a constricted tube passing from the reservoir, to the trap vessel, so that the gas is suddenly reduced in pressure as it enters the trap vessel.

21. Apparatus as claimed in claim 20, in which said tube includes a helical section for cooling.

22. Apparatus as claimed in claim 20 or 21, further comprising a second tube passing from the reservoir to the trap vessel to pass gas to the trap vessel, said second tube including a pressure responsive valve which closes the tube when the gas pressure in the reservoir is above a predetermined value.

23. A detonating gas generator or apparatus as claimed in any preceding claim, comprising means for reversing the polarity of the connections of the D.C. supply to the outer electrodes each time the generator is used.

* * * * *